United States Patent [19]

Rickert

[11] 4,067,946

[45] Jan. 10, 1978

[54] METHOD OF FORMING BAR SOAP WITH AN INSERT EMBEDDED IN THE BAR

[76] Inventor: Glenn E. Rickert, R.R. No. 9, Huntington, Ind. 46750

[21] Appl. No.: 669,281

[22] Filed: Mar. 22, 1976

[51] Int. Cl.[2] .......................... B29D 3/00; B29F 3/00

[52] U.S. Cl. .................................... 264/150; 264/158; 264/159; 264/177 R; 264/209; 264/210 R; 264/278; 264/320; 264/334

[58] Field of Search ................... 264/177 R, 148, 150, 264/157, 241, 245, 246, 249, 250, 267, 271, 310, 334, 154, 266, 294, 299, 259, 275, 278, 247, DIG. 34, 158, 159, 209, 210 R, , 320; 425/324, 111, 325, 517, 380, 381, 201, 289; 252/90, 134

[56] References Cited

U.S. PATENT DOCUMENTS

| | | | |
|---|---|---|---|
| 683,181 | 9/1901 | Mereness | 264/250 |
| 1,636,709 | 7/1927 | Schmidt | 252/92 |
| 2,423,435 | 7/1947 | Block | 264/246 |
| 2,495,005 | 1/1950 | Hoglin | 264/241 |

*Primary Examiner*—Willard E. Hoag

*Attorney, Agent, or Firm*—Gust, Irish, Jeffers & Rickert

[57] ABSTRACT

A method and apparatus for embedding a washer or other perforated plate or body in the body of a cake of soap without leaving a penetration cut in the soap billet which might crack open on, for example, future soap bar moisture changes. The relatively insoluable washer or soap plate has a central hole which is aligned with a hole at least partially through the soap cake in the finished state. The soap cake is fabricated from a soap extrusion having an oversized hole centrally located and longitudinally extending along the extrusion, or the oversized hole can be otherwise provided in a soap extrusion. The extrusion is cut off into soap billets and conveyed to a machine location where a shaft inserts the washer into the central portion of the soap billet through the oversized extruded hole in the billet. This shaft or post in cooperation with a shaft from the opposite side of the billet of soap, holds the washer in proper position in the billet hole while a pair of surfaces squeeze the soap to reduce the oversized billet hole to the diameter of the holding shafts and thus embed the washer in the soap, and produce a hole through the soap, and align the hole in the washer with the hole in the soap. The word soap is here taken to include other cake materials including detergents, etc.

8 Claims, 5 Drawing Figures

METHOD OF FORMING BAR SOAP WITH AN INSERT EMBEDDED IN THE BAR

CROSS REFERENCE TO RELATED APPLICATIONS

This invention is related to my copending application Ser. No. 651,515 filed Jan. 22, 1976 and relates to the embedding of foreign bodies in a cake of soap and especially to the elimination of the defect otherwise made in the surface and internal portion of the soap by the penetration of foreign body into the soap cake.

BACKGROUND OF THE INVENTION

The embedding of a foreign body inside a cake of soap presents the problem of healing the defect or cut where the foreign body was inserted into the cake. This applies both to soap that is hand made and to soap made on automatic soap machinery.

Quality soap bars are extruded by an extruder press under high pressure, although the extruded billet of soap is somewhat soft and workable, as to shape, it is of a nature that if a cut or hole is made in the surface and body, this cut cannot be healed by pressing the cut surfaces together.

To try to embed a foreign in soap while it is being made on a high production automatic soap making machine presents not only the problem of the insertion cut or defect, but also the problem of not reducing the number of cakes produced per unit of time, the problem of not reducing the quality or smoothness of finish on the soap cakes, the problem of not increasing the cost of producing the soap as well as other problems.

In the case of inserting a flat plate having a central hole like a washer, yet additional problems present themselves. For example, how is the soft soap material handled to avoid gumming up the many things that touch it; how is the plate controlled to end up centrally located in the soap; controlled to end up flat in a plane parallel with the flat sides of the soap; controlled to end up with its hole concentric with the hole in the soap, controlled to end up solidly embedded in a rigid fashion so as to stay in position during the life of the soap cake, etc.

The following invention is a method to solve the problems presented when attempting to manufacture soap like my copending application Ser. No. 651,515. There is first a problem of sealing the defect made in a cake of soap when a soap plate is inserted into the body of a cake of soap. Such a defect does not heal by pressing it back together, even if moisture is also applied to the surfaces before they are pressed back together. It is not desirable to manufacture soap which cracks open due to moisture changes and which cracks make the soap look bad by the dirt such cracks collect and hold.

SUMMARY OF THE INVENTION

In general and in one form of the invention apparatus for forming seamless cakes of soap like material having relatively insoluable inserts includes a frame like die into which an apertured soap cake blank may be placed, an insert supporting shaft which is movable toward and away from the die for placing the insert in the cake aperture when the blank is disposed in the die and a pair of soap surface engraving plates for plastically deforming the material about the insert. The supporting shaft may be surrounded by a surface engraving plate and both the plate and shaft independently movable toward and away from the die. The shaft may be rotated during movement thereof away from the die to aid in removing the shaft from the cake. If pin die cake forming is employed, the above mentioned frame-like die portion is not present.

Also in general a cake of soap like material is formed with a comparatively less water soluble body therein by forming a cake blank with an opening at least part way therethrough, placing the body in the opening and compressing the blank to form the material about the body to complete the forming of the cake outer surface. The opening may extend entirely through the cake blank with the forming of the blank and the opening being by an extrusion process. An air escape route from the blank may be provided during the compressing of the blank and that compressing may simultaneously emboss a design on one face of the cake.

The solution to the problem is this method invention which solves the defect problem by not making a defect, but instead provides a unique method to insert a foreign body into a cake of soap and not leave a trace where it went in. Uniquely the soap plate is injected into the soap body through a previously created oversized hole in the soap billet, then that hole size is reduced somewhat like a sphincter muscle closes the pupil size when the iris of the eye changes its pupil opening size. This reduced sized hole then becomes the required soap post hole in the soap described in my copending application Ser. No. 651,515. Thus is solved the troublesome defect problem in soap manufacture when a foreign body is injected into a soap cake.

Therefore one object of the invention is to provide a method to produce a soap cake with a centrally located plate having a hole concentric with a hole through the soap without allowing the pliable soap material to stick to the machinery parts which handle it.

A further object of the present invention is to provide a method to embed a foreign body in a cake of soap in a precise location and orientation.

A still further object of the present invention is to provide an economical method to embed a foreign object in a cake of soap being made on a modern high speed production soap machine without materially slowing down the production rate of the machine or otherwise materially increasing the cost of the soap.

A prime object of the present invention is to provide a method to insert a foreign body into soap being made into a cake, without causing a defect to the surface and internally of the cake, which could later open, and collect dirt; due to moisture changes in the soap bar.

BRIEF DESCRIPTION OF THE DRAWING

Other advantages of the invention will hereinafter become more fully apparent from the following detailed description of a preferred embodiment of the invention when considered in conjunction with the accompanying drawings throughout which like reference characters indicate like parts and in which.

DESCRIPTION OF THE PREFERRED EMBODIMENT

Figure 1:
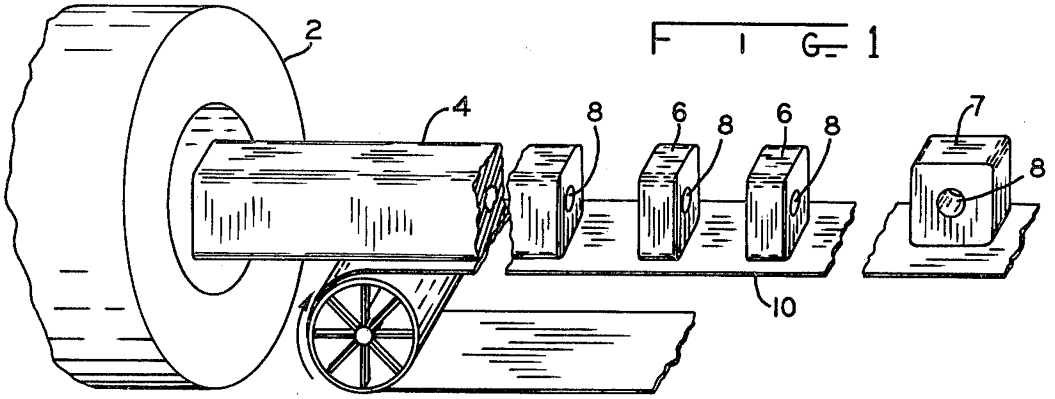
FIG. 1 is a diagrammatic perspective view of extruded soap material having been cut into soap billets.

In the preferred form and, referring to FIG. 1, the extruded soap material 4, is cut or sliced into billets 6. The extruder 2 extrudes the soap material 4 with a centrally located hole 8. The soap billets 6 have been cut off of the extrusion for soap billet thickness. Conventional soap machinery cuts the extrusion off the soap billet length. To adapt this system into conventional machinery requires then that the billet be re-oriented by about 90° on a conveyor 10 to travel endwise as billet 7 is shown. The billet can be simply turned 90° and continue travel in the same direction or the billet can be put on a second conveyor traveling about 90° from the first conveyor also resulting in the desired endwise travel. Furthermore, in this invention the cake is cut to be oversized, for example, as to thickness so as to later be pressed into a thinner cake. If the oversized hole is provided other than by extrusion the 90° turn may not be required and the soap can be conventionally extruded.

Figure 2:
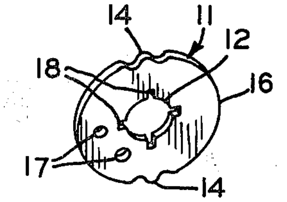
FIG. 2 shows one form of soap plate.

FIG. 2 shows a soap plate 11 in the shape of a washer with a central hole 12. The washer is shown to partially have a scalloped 14 periphery to help secure it in the soap. The entire periphery can be made irregular in this way, or it can be smooth as shown in the area of 16. The periphery of the soap plate can be any shape, rectangular, star, etc. shaped. It can have an irregular edge, have turned up edges and/or holes 17 in the body of the plate, etc. The hole 12 in the plate can be round, oval, triangular, square, etc.

Notches 18 or holes 17 near the hole 12 can be employed to aid trapped air near the soap plate to escape during the embedding process, as well as to help secure the plate in the soap.

Figure 3:
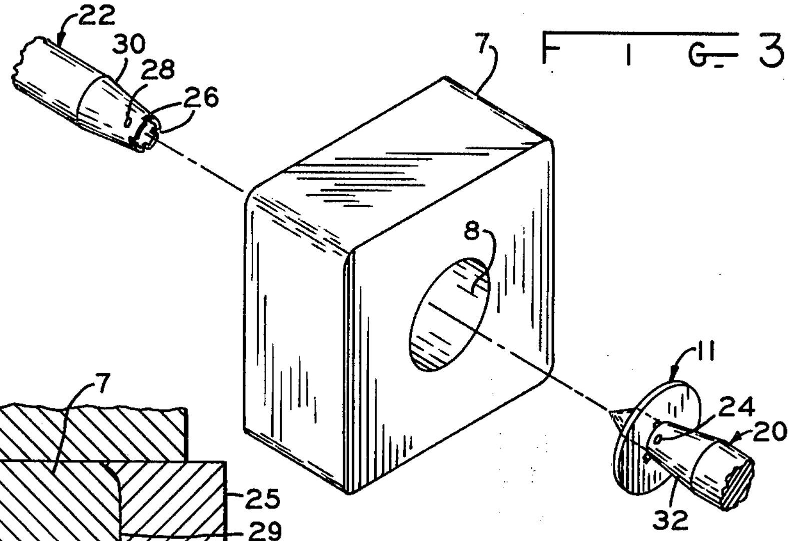
FIG. 3 is a perspective view of a soap plate located on the inserter bar or post ready to be inserted into a soap billet.

FIG. 3 shows the soap billet 7 with an extruded or otherwise provided hole 8 oriented to accept the insertion of the soap plate 11 by the inserter post 20. The inserter 20 is shown as a male post. A female backup post 22 enters the soap billet from the other side which can help position the soap plate inside the extruded hole 8, and especially to retain a hole all the way through the finished cake. The backup post 22 may have air vent notches 26 at its tip and/or holes 28 near the tip or even along the tapered portion 30 which connect to an optional hollow central portion of the post 22. Likewise the inserter post 20 can also be similarly equipped. As there is a great difference in so called "soap" materials, some of which are not soap, but are detergents, the use of the optional air vents and other options above described, is dependent on how a particular "soap" material works. Conventional soap, bubble filled Ivory soap, Trilby soap, cold cream filled soap, and detergent "soaps" which are not actually soaps, vary somewhat in the way they can be handled in manufacture.

Figure 5:
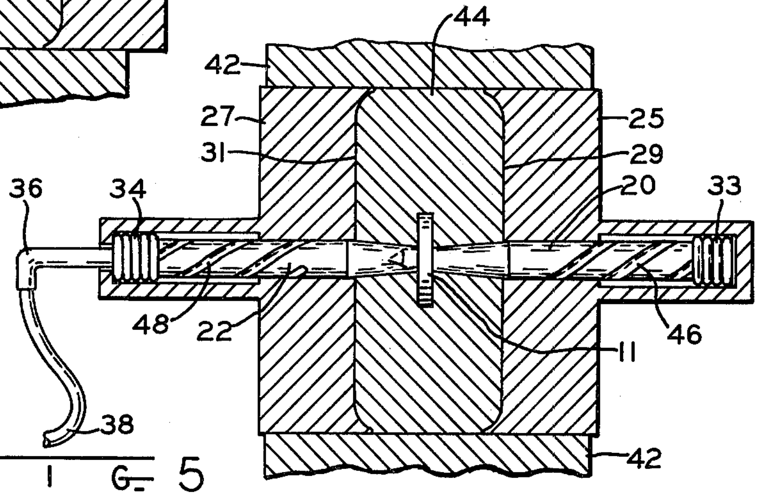
FIG. 5 is a cross section view of a billet of soap which has been squeezed to surround and embed the soap plate.

For this reason the inserter post 20 and the female backup post 22 can be also optionally rotated when they are withdrawn from the finished cake of soap, as shown in FIG. 5 to help release the hold of the soap to their surfaces. This will be considered more fully later.

Figure 4:
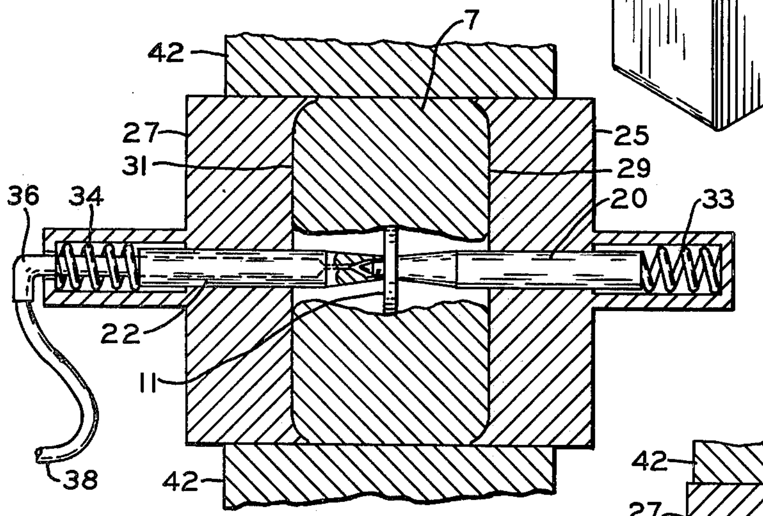
FIG. 4 is a side cross section view of a soap plate held inside a billet of soap by the inserter post and the backup post with the extruded billet hole showing the early collapse effect of being squeezed.

In reference to FIG. 4 the posts 20 and 22 are shown installed in the squeeze plates 25, 27. These squeeze plates can be squeeze plates free of any engraving on their soap contacting squeeze surfaces 29, 31, or they can be engraved and perform the final finish on the soap surface. In either case the squeeze plates press on the soap billet 7 to either partially or fully embed the soap plate 11. The embedding process can be performed by squeeze plates as shown or other things pushing in on any of the surfaces of the soap billet to partially or fully embed the plate 11.

In the preferred form of the invention the squeeze plates 25, 27 are also the engraving plates or dies with the final engraving on their surfaces 29, 31, and in one station in manufacture, the soap plate 11 is inserted into hole 8, FIG. 3, the squeeze plates dies then squeeze the billet 7 and engrave the billet 7 while also embedding the soap plate 11 therein. The posts 20, 22 are free for limited travel to protrude both more and less from the surface 29, 31 of the squeeze plates 25, 27. These posts 20, 22 can be spring 33, 34 loaded or otherwise movably mounted to initially protrude from the squeeze plate surfaces 29, 31 sufficient to pick up a soap plate 11 from a supply feed system and insert and secure that soap plate in the extruded hole 8 of the billet 7. When these posts 20, 22 meet in the billet hole holding a soap plate 11, the squeeze plates slide along the posts to compress the soap billet 7 around the plate 11. The post 22 and/or post 20 can optionally have a hollow center and air vent tube 36 exit 38. Exit 38 can be open to the atmosphere or be connected to a vacuum pump which exhausts air trapped near the soap plate 11 and along the tapers 30, 32, FIG. 3, through notches and holes 24, 26, and 28. Additionally, air under pressure can be employed to aid the removal of the posts from the soap after the plate embedment. Some of these last details are shown in FIG. 3 but not in FIG. 4 to avoid confusion but are optionally present. In FIG. 4 the billet 7 is shown in the process of being formed or pressed to embed plate 11. The billet 7 is confined on other surfaces by the body or frame 42. If pin dies are employed, the frame 42 can be eliminated.

Going now to FIG. 5, when the billet 7 of FIG. 4 has be compressed the desired amount, the squeeze plates 25, 27 and the posts 20, 22 are withdrawn from the finished cake 44. These parts may be kept cold and "wet" or otherwise handled as in conventional soap manufacture to avoid their sticking to the soap material.

To further aid release of the plates 25, 27 and posts 20, 22, the posts 20, 22 can be rotated before and/or when withdrawn from the cake 44. Whether the squeeze plates 25, 27 are withdrawn before the posts 20, 22, after the posts 20, 22 are withdrawn, or whether both the squeeze plates and the posts are withdrawn at the same time is optional, to be judged by the characteristics of the soap material being formed. Spiral threads 46, 48, FIG. 5, are shown on posts 20, 22 to indicate a simple method of rotating spring loaded posts if the plates 24, 26 are withdrawn before the posts, due to the simple action of the springs 33, 34 holding the posts 20, 22 in position while the plates 25, 27 retract and the posts rotate by the threads 46, 48 acting against mating threads in the plates 25, 27 bodies.

If it is desired to withdraw the posts 20, 22 before the plates 25, 27, conventional structure, not shown, is required to pull the posts 20, 22 from the soap 44 body against the spring 33, 34 tensions. These posts may be rotated by the aforementioned spiral threads 46, 48 while being withdrawn, or otherwise rotated if desired.

In the preferred form an oversized extruded hole in the soap billet is employed as the route of entry for the soap plate into the soap, but the soap plate can be simply pushed into a solid billet and make its own hole as it goes in, or a smaller hole can be made prior to the plate entry and let the plate enlarge the hole as it enters. Additionally, an independent tool can make a hole 1/2 way or all the way in the soap billet. In all cases the route of entry closes down to about the soap post hole size needed in the finished soap. The size of the hole extruded or otherwise created in the soap billets 6 and 7 can be sufficiently large to permit easy entry of the soap plate, or can be the size of the backup female post in one half of the billet and a larger size like the size of the soap plate in the other half, or can be and desired size. The preferred form is to produce the hole sufficiently large to permit easy entry of the soap plate, i.e. about the size of the soap plate.

If it is desired that the finished hole in the soap goes in only from one side to the soap plate, and that the other side of the soap be free of any hole, the inserter post 20 FIGS. 3, 4 and 5 can grip the soap plate and insert it into the soap cake, and the post 22 can be eliminated from the action. The air evacuation holes 26, 28, FIG. 3, air pipe 36 and 38, FIG. 4, can be used on post 20. Post 20 may need to be hollow as was described concerning post 22 to conduct air and possible soap bits.

Although the invention has been described in bits and pieces, these bits and pieces when added to a modern soap making machine and when that machine is modified as here shown and described, the machine then becomes capable of inserting a soap plate into a soap billet to manufacture soap containing a foreign body without creating an undesired defect in the surface of internally of the soap cake, and without materially changing the speed of production of the soap machinery. Furthermore, it should be noted that these modifications of established soap making machinery to this method of foreign body insertion provides a very economical change of conventional machinery to do such a new thing.

While the basic principal of this method invention has been herein illustrated along with the preferred embodiment, it will be appreciated by those skilled in the art that variations in the disclosed arrangement both as to its details and as to the organization of such details may be made without departing from the spirit and scope thereof. Accordingly, it is intended that the foregoing disclosure and the showings made in the drawings will be considered only as illustrative of the principles of the invention and not construed in a limiting sense.

What is claimed is:

1. The method of embedding a body in a cake of soap-like material comprising the steps of:

forming a billet of the soap-like material;

providing an opening at least part way through the billet;

inserting the body into the billet by supporting the body on a shaft and passing the shaft into the opening;

compressing the billet to about said shaft and said body and removing said shaft after the billet has been compressed leaving an opening in said billet.

2. The method of claim 1 comprising the further step of rotating the shaft during the step of removing.

3. The method of claim 1 including the further step of providing an air escape path from the billet opening during compression.

4. The method of claim 1 wherein the step of compressing includes confining the peripheral edges of the billet and squeezing the opposed faces of the billet toward one another to simultaneously emboss a design on at least one face and embed the body in the cake.

5. The method of claim 1 comprising the further step of rotating the shaft during the step of removing.

6. The method of claim 1 wherein the step of compressing includes confining the peripheral edges of the blank in a frame and squeezing the opposed faces of the blank toward one another to simultaneously emboss a design on at least one face and embed the body in the cake.

7. The method of claim 1 wherein the step of forming includes extruding a length of soap-like material and slicing the length generally perpendicular to the direction of extrusion to form the billets.

8. The method of claim 7 wherein the opening extends entirely through the cake blank, the step of providing and the step of extruding being performed simultaneously as an extrusion process.

* * * * *

UNITED STATES PATENT AND TRADEMARK OFFICE

CERTIFICATE OF CORRECTION

PATENT NO. : 4,067,946

DATED : January 10, 1978

INVENTOR(S) : Glenn E. Rickert

It is certified that error appears in the above–identified patent and that said Letters Patent are hereby corrected as shown below:

Column 1, line 21, before "although" insert ---and---.

Column 1, line 26, after "foreign" insert ---body---.

Column 3, line 12, "the", second occurrence, should read -- for--.

Column 4, line 12, "plates" should read ---plate---.

Column 4, line 40, "be" should read ---been---.

Column 4, line 63, "spring" should read ---springs---.

Column 5, line 12, "and" should read ---any---.

Column 5, line 24, "possible" should read ---possibly---.

Column 5, line 31, "of" should read ---or---.

IN THE CLAIMS

Column 6, line 14, delete "to".

Signed and Sealed this

*Eighth* Day of *August 1978*

[SEAL]

*Attest:*

RUTH C. MASON
*Attesting Officer*

DONALD W. BANNER
*Commissioner of Patents and Trademarks*